July 16, 1963
D. Z. CHAPMAN
3,097,559
CLEVIS PIN WITH SPRING URGED DETENTS
AND MEANS TO LIMIT SPRING MOVEMENT
Filed July 28, 1958
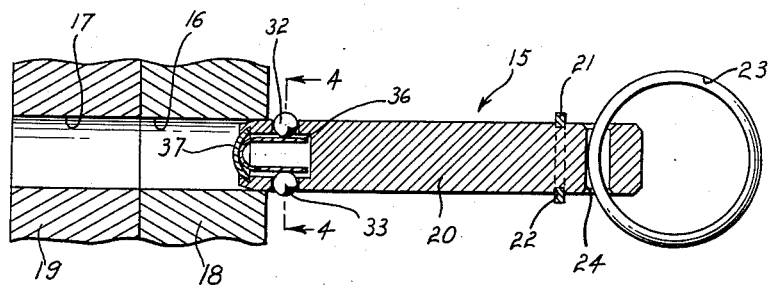
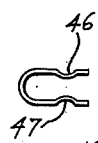
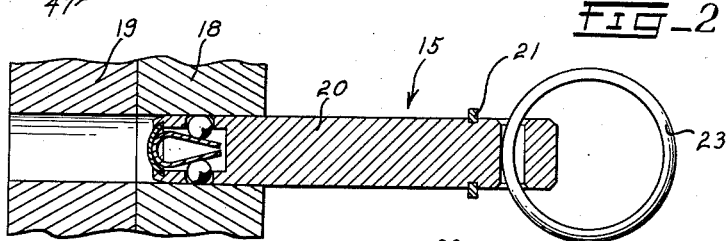
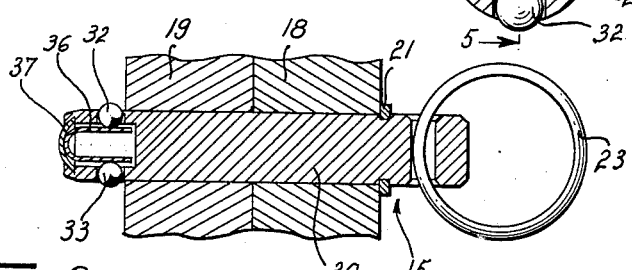
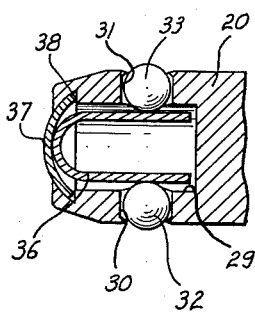
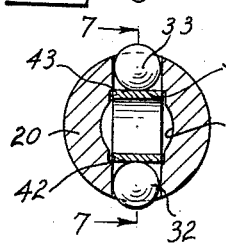
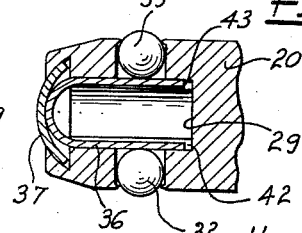
DAVID Z. CHAPMAN
INVENTOR.
BY HIS ATTORNEYS
HARRIS, KIECH, FOSTER & HARRIS

United States Patent Office 3,097,559
Patented July 16, 1963

3,097,559
CLEVIS PIN WITH SPRING URGED DETENTS AND MEANS TO LIMIT SPRING MOVEMENT
David Z. Chapman, Los Angeles, Calif., assignor, by mesne assignments, to Aerpat A.G., Glarus, Switzerland, a corporation of Switzerland
Filed July 28, 1958, Ser. No. 751,208
3 Claims. (Cl. 85—5)

This invention relates to fasteners and, in particular, to clevis pin type fasteners of the rapid engagement, quick release variety. The fastener of the invention may be used to join two or more members by inserting a fastener into registering holes in the members and may also be used to mount one member on another by affixing the fastener to one member and locking into an opening in the other member.

The invention contemplates the use of a fastener having a body with a spring chamber therein, a detent carried in the body adjacent the spring chamber and movable inwardly and outwardly between inner, retracted and outer, extended positions with the detent projecting laterally from the body when in the extended position for locking the fastener in place. A spring is carried in the spring chamber for urging the detent toward the outer, extended position.

The fastener of the invention is particularly adapted for service where large centrifugal forces are produced. One problem encountered in the manufacture of fasteners of this general type is the retention of the detents. It is necessary that the passage in which the detents move permit free movement of the detents and extension of the detents laterally beyond the body of the fastener while at the same time the detents must be prevented from moving out of the passages and becoming lost. The detents are ordinarily retained by staking or peening around the outer ends of the detent passages and such construction will normally suffice to retain the detents against the centrifugal forces acting thereon. However, in structures such as those of the invention where spring means are used to urge the detents to the outer positions, the combination of the centrifugal force on the detent, the spring force, and the centrifugal force acting on the spring, which is transmitted to the detent by contact, will be considerably greater than the centrifugal force on the detent alone thereby materially complicating the detent retention problem. Accordingly, it is an object of the invention to provide a fastener of the detent and spring type wherein the forces tending to eject the detents from the fastener are limited. A further object is to provide such a fastener wherein the only forces acting on a detent when in the engaged position is the centrifugal force due to the mass of the detent.

It is an object of the invention to provide a fastener wherein a detent is positioned in a lateral passage between the exterior of the fastener body and a spring chamber within the body and wherein spring means positioned within the chamber engages the detent urging the detent toward the extended position with the outward movement of the spring means limited so that the spring means does not engage the detent when the latter is fully extended. A further object of the invention is to provide such a fastener wherein a compression spring comprising a folded strip of resilient material is positioned within the spring chamber engaging the detent except when the detent is in its fully extended position. A further object of the invention is to provide such a fastener wherein two detents are provided on opposite sides of the fastener body with a U-shaped spring positioned therebetween with the arms of the spring contacting the detents and urging them toward their extended positions. Another object of the invention is to provide such a fastener wherein the spring chamber is notched to receive the spring means and prevent relative rotation of the fastener body and the spring means.

It is an object of the invention to provide a fastener of the detent and spring type in which the outward forces on the detents are limited and which may be used with various shapes of fasteners such as square, round, and the like, and with various shapes and numbers of detents and with various types of compression springs. A particular object of the invention is to provide such a fastener utilizing a U-shaped compression spring and a pair of ball detents with the arms of the spring engaging the balls and urging them toward their extended positions and with the arms engaging the wall of the spring chamber before the balls reach their maximum outer positions.

The invention will be described in detail herein in connection with a fastener which includes a barrel or cylindrical body having one or more lateral holes therethrough adjacent one end thereof, a detent in each of the lateral holes in the body and movable inwardly and outwardly therein and between inner retracted and outer extended positions with each such detent projecting laterally from the body when in its extended position to prevent withdrawal of the body from the member in which the fastener is positioned, and a spring positioned within the body between the detents for urging the detents outward.

The invention also comprises novel details of construction and novel combinations and arrangements of parts together with other objects, advantages, features, and results which will more fully appear in the course of the following description. The drawing merely shows and the description merely describes preferred embodiments of the present invention which are given by way of illustration or example.

In the drawing:

FIG. 1 shows a sectional view of a preferred embodiment of the invention;

FIG. 2 shows a sectional view of the embodiment of FIG. 1 in the partially engaged condition;

FIG. 3 shows the embodiment of FIGS. 1 and 2 in the fully engaged position;

FIG. 4 is an enlarged sectional view taken along the line 4—4 of FIG. 1;

FIG. 5 is a sectional view taken along the line 5—5 of FIG. 4;

FIG. 6 is a sectional view of an alternative embodiment of the invention;

FIG. 7 is a sectional view taken along the line 7—7 of FIG. 6; and

FIGS. 8 and 9 show alternative forms of the spring of the invention.

Referring to FIGS. 1 through 5 of the drawing, a fastener 15 is inserted through registering holes 16, 17 in plates 18, 19, respectively, for locking the plates together. The fastener 15 includes a body 20 which is a sliding fit in the holes 16, 17. A ring 21 is positioned in an annular groove 22 in the body for limiting the movement of the fastener through the plates as shown in FIG. 3. Another ring 23 passes through a lateral opening 24 in the body 20 adjacent one end thereof, the ring 23 providing for manual insertion and removal of the fastener.

A chamber 29, which may be a coaxial counterbore, is provided in the other end of the body 20 and lateral passages 30, 31 provide communication between the chamber 29 and the exterior of the body (FIGS. 4 and 5). Ball detents 32, 33 are positioned in the passages 30, 31, respectively, for movement inwardly and outwardly between inner, retracted positions, shown in FIG. 2, and outer, extended positions, shown in FIGS. 1, 3, 4 and 5. The detents 32, 33 prevent withdrawal of the body 20 of the fastener from the openings in the plates 18, 19 when the detents are in their extended positions (FIG.

3). The body 20 is peened or staked adjacent the outer ends of the passages 30, 31 to retain the detents in the passages, as best seen in FIG. 5.

A spring is carried within the chamber 29 for urging the detents 32, 33 toward the outer position. A preferred form of the spring is shown in the embodiment of FIGS. 1 through 5 as consisting of a strip of resilient material formed into a U-shaped compression spring 36 and positioned within the chamber 29 with the arms of the U engaging the detents. A cap 37 may be fixed in the detent end of the body by suitable means such as by positioning the cap against a shoulder 38 and spinning the tip of the body thereover, the cap serving to retain the spring 36 within the chamber 29. The shape of the cap is not critical, the preferred spherical form being shown in the drawing, although it may be a flatplate, a closed cylinder or the like.

Normally, the spring 36 urges the detents 32, 33 toward their outer extended positions, as seen in FIG. 1. When it is desired to use the fastener of the invention to fasten two plates together, the openings in the plates are aligned and the detent end of the fastener is positioned in one of the openings (FIG. 1). The fastener is then pushed into the opening with sufficient force to compress the spring 36 by engagement of the plate 18 with the detents, the detents moving toward their inner, retracted positions until they are flush with the outer surface of the body 20, permitting the fastener to move through the aligned openings (FIG. 2). When the detents emerge from the opening 17 in the plate 19, they return to their normal extended positions, retaining the fastener in the aligned openings and holding the plates together. The fastener is removed by pulling to the right with sufficient force to again compress the spring 36 and move the detents to their inner positions.

The spring 36, the chamber 29, and the detents 32, 33 are so dimensioned that the spring will engage the wall of the chamber and limit the expansion of the spring before the detents reach the limit of their outward movement. This is best seen in FIG. 4, where the spring 36 engages the chamber 29 as at 39, leaving a slight amount of play or freedom of movement for the detents. This feature of the fastener of the invention is important when the fastener is used in locations subject to large centrifugal forces. When the fastener is engaged, as shown in FIG. 3, there will be no outward force transmitted from the spring to the detents since the spring is engaged by the wall of the chamber. Thus, spring forces due to compression of the spring and centrifugal forces due to the mass of the spring do not act on the detents and need not be restrained by the staking or peening which holds the detents in place. Because of this construction, the fastener of the invention may be used under much more severe environmental conditions than conventional fasteners.

An alternative form for the chamber 29 is shown in FIGS. 6 and 7. Opposing notches, 42, 43 are provided in the wall of the chamber 29 to receive the opposing arms of the spring 36, thereby preventing rotation of the spring within the chamber. As in the previous embodiment, the spring, the chamber, the notches and the detents are dimensioned so that the spring expansion is limited by engagement with the wall of the chamber before the outward movement of the detents is limited.

An alternative form for the spring 36 is shown in FIG. 8. The concave sections 46, 47 are intended to receive the detents and serve to maintain the spring in position. Another alternative form for the spring is shown in FIG. 9.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A quick release clevis pin for rotary members having aligned openings therein, said clevis pin comprising: a cylindrical body receivable in the aligned openings and having a laterally projecting shoulder adjacent one end and a coaxial bore in the other end; a cap closing the outer end of said bore to define with said bore, a spring chamber, said body also having opposed radial passages extending from said chamber, outwardly to the exterior of said body; a ball detent carried in each of said radial passages and movable inwardly and outwardly between inner retracted and outer extended positions, said ball detents projecting radially beyond the exterior of said body when in said extended positions, the outer ends of said radial passages having means providing a restricted portion to limit outward movement of said ball detents; a U-shaped compression spring having at least two outwardly biased arms, said spring being positioned within said chamber with said arms extending generally axially of said bore and urging said ball detents to said outer extended position, said arms, said ball detents and said bore being relatively dimensioned so that said arms engage the wall of said bore with said ball detents spaced radially inwardly from said means, whereby the force with which said ball detents are urged outwardly against the outer restricted end of said radial passages upon rotation of the rotary members is unaffected by said spring.

2. The clevis pin recited in claim 1 in which opposed notches are formed in the wall of said bore adjacent said radial passages to limit outward movement of said arms.

3. The clevis pin recited in claim 1 in which said arms are formed having concave portions for engaging said ball detents.

References Cited in the file of this patent

UNITED STATES PATENTS

| 33,515 | Chapman et al. | Oct. 22, 1861 |
| 606,639 | Baumann | July 5, 1898 |
| 2,132,284 | Bonham | Oct. 4, 1938 |
| 2,721,090 | Kaman | Oct. 18, 1955 |
| 2,983,978 | Wilgus | May 16, 1961 |

FOREIGN PATENTS

| 431,834 | France | Sept. 21, 1911 |
| 555,374 | Great Britain | Aug. 19, 1943 |
| 575,355 | Great Britain | Feb. 14, 1946 |
| 698,737 | Great Britain | Oct. 21, 1953 |